(12) United States Patent
Peterson et al.

(10) Patent No.: US 9,242,308 B2
(45) Date of Patent: Jan. 26, 2016

(54) OUT OF POSITION FRICTION STIR WELDING OF CASING AND SMALL DIAMETER TUBING OR PIPE

(71) Applicant: MEGASTIR TECHNOLOGIES LLC, Provo, UT (US)

(72) Inventors: Jeremy Peterson, Cedar Hills, UT (US); John Hall, Bountiful, UT (US); Russell J Steel, Salem, UT (US); Jonathan Babb, West Jordan, UT (US); Matt Collier, Draper, UT (US); Scott M. Packer, Alpine, UT (US)

(73) Assignee: MEGASTIR TECHNOLOGIES LLC, Provo, UT (US)

( * ) Notice: Subject to any disclaimer, the term of this patent is extended or adjusted under 35 U.S.C. 154(b) by 0 days.

(21) Appl. No.: 14/254,734

(22) Filed: Apr. 16, 2014

(65) Prior Publication Data
US 2014/0263574 A1 Sep. 18, 2014

Related U.S. Application Data

(62) Division of application No. 12/938,004, filed on Nov. 2, 2010, now abandoned.

(60) Provisional application No. 61/257,049, filed on Nov. 2, 2009.

(51) Int. Cl.
*B23K 20/12* (2006.01)
*B23K 37/053* (2006.01)

(52) U.S. Cl.
CPC ........... *B23K 20/1255* (2013.01); *B23K 20/126* (2013.01); *B23K 37/0533* (2013.01)

(58) Field of Classification Search
CPC ............. B23K 37/0531; B23K 20/126; B23K 2201/06; B23K 20/1245; B23K 37/0426; B23K 9/035; B23K 20/122; B23K 20/1225; B23K 2201/04; F16L 1/10; F16L 55/26
USPC ......................... 228/112.1, 2.1, 4.1
See application file for complete search history.

(56) References Cited

U.S. PATENT DOCUMENTS

| 1,351,445 A | 8/1920 | Smith |
|---|---|---|
| 2,826,420 A | 3/1958 | Klingler |

(Continued)

FOREIGN PATENT DOCUMENTS

| CA | 2582732 | 4/2006 |
|---|---|---|
| EP | 0 535 277 | 4/1993 |
| EP | 0 797 043 | 9/1997 |
| EP | 0 810 054 | 12/1997 |
| EP | 0 833 097 | 4/1998 |
| EP | 0 867 254 | 9/1998 |
| EP | 0 810 056 | 12/1998 |

(Continued)

OTHER PUBLICATIONS

International Preliminary Report on Patentability of PCT Application No. PCT/US2010/002884 dated May 8, 2012: pp. 1-6.

*Primary Examiner* — Erin Saad
(74) *Attorney, Agent, or Firm* — Morriss O'Bryant Compagni, PC

(57) ABSTRACT

A system and method for friction stir welding of small diameter tubing, wherein the small diameter tubing is held in a correct position with a grasp sufficient to perform FSW when the tubing is comprised of high melting temperature materials, wherein the small diameter tubing can be rotated by the positioning and holding system while a FSW tool is held stationary, or vice versa, wherein internal mandrels are also described which can fit inside the smaller dimensions of the small diameter tubing and expand to provide a counter force to prevent deformation of the tubing when forces are applied by the FSW tool, wherein new FSW tool geometries are also described which enable the FSW tool to direct more heat on a tool/workpiece interface to counteract a lack of contact between the FSW shoulder and the workpiece because of tube curvature, and wherein the FSW tool is positioned on a small diameter tube by trailing the joint to provide desirable heating at the joint/workpiece interface and surface finishing.

17 Claims, 12 Drawing Sheets

(56) References Cited

U.S. PATENT DOCUMENTS

| | | | |
|---|---|---|---|
| 2,832,604 A | 4/1958 | Le Brusque | |
| 2,853,773 A | 9/1958 | Darasko | |
| 2,878,770 A | 3/1959 | Work et al. | |
| 2,962,291 A | 11/1960 | Szlachetka | |
| 3,033,145 A | 5/1962 | Thielsch | |
| 3,259,964 A | 7/1966 | Engel | |
| 3,425,614 A | 2/1969 | Clark | |
| 3,498,518 A | 3/1970 | Wheeler | |
| 3,561,320 A | 2/1971 | Nelson et al. | |
| 3,902,385 A | 9/1975 | Haby | |
| 3,938,140 A | 2/1976 | Garcia et al. | |
| 3,952,384 A | 4/1976 | Goldry et al. | |
| 3,964,290 A | 6/1976 | Auxer | |
| 4,063,676 A | 12/1977 | Lilly | |
| 4,144,110 A | 3/1979 | Luc | |
| 4,201,326 A | 5/1980 | Connell | |
| 4,352,285 A | 10/1982 | LaRue et al. | |
| 4,560,931 A | 12/1985 | Murakami et al. | |
| 4,582,241 A * | 4/1986 | Johnson | 228/49.3 |
| 4,682,724 A | 7/1987 | Hahn | |
| 5,110,031 A | 5/1992 | Rinaldi | |
| 5,323,950 A | 6/1994 | Mamon | |
| 5,460,317 A | 10/1995 | Thomas et al. | |
| 5,515,083 A | 5/1996 | Casebolt et al. | |
| 5,611,479 A | 3/1997 | Rosen | |
| 5,697,511 A | 12/1997 | Bampton | |
| 5,711,702 A | 1/1998 | Devlin | |
| 5,713,507 A | 2/1998 | Holt et al. | |
| 5,718,366 A | 2/1998 | Colligan | |
| 5,758,999 A | 6/1998 | Geise | |
| 5,769,306 A | 6/1998 | Colligan | |
| 5,794,835 A | 8/1998 | Colligan et al. | |
| 5,811,755 A | 9/1998 | McGee | |
| 5,813,592 A | 9/1998 | Midling et al. | |
| 5,829,664 A | 11/1998 | Spinella et al. | |
| 5,971,247 A | 10/1999 | Gentry | |
| 5,971,252 A | 10/1999 | Rosen et al. | |
| 5,975,406 A | 11/1999 | Mahoney et al. | |
| 6,045,027 A | 4/2000 | Rosen et al. | |
| 6,045,028 A | 4/2000 | Marlin et al. | |
| 6,050,474 A | 4/2000 | Aota et al. | |
| 6,050,475 A | 4/2000 | Kinton et al. | |
| 6,051,325 A | 4/2000 | Talwar et al. | |
| 6,053,391 A | 4/2000 | Heiderman et al. | |
| 6,070,784 A | 6/2000 | Holt et al. | |
| 6,138,895 A | 10/2000 | Oelgoetz et al. | |
| 6,168,066 B1 | 1/2001 | Arbegast | |
| 6,168,067 B1 | 1/2001 | Waldron et al. | |
| 6,173,880 B1 | 1/2001 | Ding et al. | |
| 6,193,137 B1 | 2/2001 | Ezumi et al. | |
| 6,206,268 B1 | 3/2001 | Mahoney | |
| 6,257,479 B1 | 7/2001 | Litwinski et al. | |
| 6,259,052 B1 | 7/2001 | Ding et al. | |
| 6,421,578 B1 | 7/2002 | Adams et al. | |
| 6,450,395 B1 | 9/2002 | Weeks et al. | |
| 6,497,355 B1 | 12/2002 | Ding et al. | |
| 6,575,250 B1 | 6/2003 | Wijsman | |
| 6,648,206 B2 | 11/2003 | Nelson et al. | |
| 6,669,075 B2 | 12/2003 | Colligan | |
| 6,676,008 B1 | 1/2004 | Trapp et al. | |
| 6,726,084 B2 | 4/2004 | Duncan, Jr. | |
| 6,779,704 B2 | 8/2004 | Nelson et al. | |
| 6,783,055 B2 | 8/2004 | Ezumi et al. | |
| 6,866,181 B2 | 3/2005 | Aota et al. | |
| 6,915,939 B2 | 7/2005 | Hashimoto | |
| 6,915,943 B2 | 7/2005 | Laing | |
| 6,972,753 B1 | 12/2005 | Kimura et al. | |
| 6,994,242 B2 | 2/2006 | Fuller | |
| 7,234,626 B2 | 6/2007 | Trapp et al. | |
| 7,270,257 B2 | 9/2007 | Steel et al. | |
| 7,383,975 B2 | 6/2008 | Stol et al. | |
| 7,401,723 B2 | 7/2008 | Stol et al. | |
| 7,651,018 B2 | 1/2010 | Packer et al. | |
| 2002/0011509 A1 | 1/2002 | Nelson et al. | |
| 2002/0092888 A1 | 7/2002 | Ezumi et al. | |
| 2004/0108359 A1 | 6/2004 | Hashimoto et al. | |
| 2004/0108980 A1 | 6/2004 | Yonekubo et al. | |
| 2004/0155091 A1 | 8/2004 | Badrak | |
| 2005/0035173 A1 | 2/2005 | Steel et al. | |
| 2005/0082342 A1 | 4/2005 | Babb et al. | |
| 2005/0121497 A1 | 6/2005 | Fuller et al. | |
| 2006/0081683 A1 | 4/2006 | Packer et al. | |
| 2006/0175382 A1 | 8/2006 | Packer et al. | |
| 2006/0231595 A1 | 10/2006 | Quinn et al. | |
| 2006/0289608 A1 | 12/2006 | Steel et al. | |
| 2007/0057015 A1 | 3/2007 | Colligan | |
| 2008/0029578 A1 | 2/2008 | Steel et al. | |
| 2008/0048005 A1 | 2/2008 | Forrest et al. | |
| 2008/0135405 A1 | 6/2008 | Hori et al. | |
| 2010/0176182 A1 * | 7/2010 | Hanlon et al. | 228/2.1 |

FOREIGN PATENT DOCUMENTS

| | | |
|---|---|---|
| EP | 0 888 843 | 1/1999 |
| EP | 0 893 189 | 1/1999 |
| EP | 0 893 190 | 1/1999 |
| EP | 0 925 964 | 6/1999 |
| EP | 0 928 659 | 7/1999 |
| EP | 0 947 280 | 10/1999 |
| EP | 0 810 055 | 12/1999 |
| EP | 0 968 788 | 1/2000 |
| EP | 0 972 605 | 1/2000 |
| EP | 0 985 483 | 3/2000 |
| EP | 0 992 314 | 4/2000 |
| EP | 1 029 627 | 8/2000 |
| EP | 1 046 453 | 10/2000 |
| EP | 1 048 390 | 11/2000 |
| EP | 1 055 478 | 11/2000 |
| EP | 1 057 572 | 12/2000 |
| EP | 1 057 573 | 12/2000 |
| EP | 1 057 574 | 12/2000 |
| EP | 1 057 575 | 12/2000 |
| EP | 1 057 576 | 12/2000 |
| EP | 1 147 846 | 10/2001 |
| GB | 2 261 623 | 5/1993 |
| GB | 2 306 336 | 5/1997 |
| JP | 60199592 | 10/1985 |
| JP | 1085836 | 4/1998 |
| JP | 11 226757 | 8/1999 |
| JP | 2000-153377 | 6/2000 |
| JP | 2001 287053 | 10/2001 |
| JP | 2003112272 | 4/2003 |
| JP | 2005329463 | 12/2005 |
| JP | 2007301579 | 11/2007 |
| WO | WO 93/10935 | 6/1993 |
| WO | WO 97/15462 | 5/1997 |
| WO | WO 97/48517 | 12/1997 |
| WO | WO 98/13167 | 4/1998 |
| WO | WO 98/45080 | 10/1998 |
| WO | WO 98/51441 | 11/1998 |
| WO | WO 98/58759 | 12/1998 |
| WO | WO 99/32255 | 7/1999 |
| WO | WO 99/33597 | 7/1999 |
| WO | WO 99/34951 | 7/1999 |
| WO | WO 99/39861 | 8/1999 |
| WO | WO 99/52669 | 10/1999 |
| WO | WO 99/54081 | 10/1999 |
| WO | WO 99/58288 | 11/1999 |
| WO | WO 99/65637 | 12/1999 |
| WO | WO 00/02698 | 1/2000 |
| WO | WO 00/02699 | 1/2000 |
| WO | WO 00/02704 | 1/2000 |
| WO | WO 00/03818 | 1/2000 |
| WO | WO 00/56497 | 9/2000 |
| WO | WO 01/85385 | 11/2001 |
| WO | WO 02/100586 | 12/2002 |
| WO | WO 03/073526 | 9/2003 |
| WO | WO 2004/067218 | 8/2004 |

* cited by examiner

OUT OF POSITION FRICTION STIR WELDING OF CASING AND SMALL DIAMETER TUBING OR PIPE

BACKGROUND OF THE INVENTION

1. Field of the Invention

This invention relates generally to friction stir welding (FSW) and its variations including friction stir processing (FSP), friction stir spot welding (FSSW) and friction stir mixing (FSM) (and hereinafter referred to collectively as "friction stir welding"). Specifically, the invention relates to the problems that are unique to friction stir welding of high temperature materials when these materials are in the shape and size of a small pipe or tubular object (hereinafter "tube, tubes, or tubing"). The specific focus of the inventions are 1) holding a small diameter tube in order to perform friction stir welding, 2) preventing deformation of the small diameter tube caused by the force of a FSW tool by providing an internal mandrel, 3) providing a FSW tool that has a geometry that is uniquely adapted to performing FSW on a small diameter tube, and 4) the process parameters that must be used when performing FSW on a small diameter tube.

2. Description of Related Art

Friction stir welding is a technology that has been developed for welding metals and metal alloys. Friction stir welding is generally a solid state process. Solid state processing is defined herein as a temporary transformation into a plasticized state that typically does not include a liquid phase. However, it is noted that some embodiments allow one or more elements to pass through a liquid phase, and still obtain the benefits of the present invention.

The friction stir welding process often involves engaging the material of two adjoining workpieces on either side of a joint by a rotating stir pin. Force is exerted to urge the pin and the workpieces together and frictional heating caused by the interaction between the pin, shoulder and the workpieces results in plasticization of the material on either side of the joint. The pin and shoulder combination or "FSW tip" is traversed along the joint, plasticizing material as it advances, and the plasticized material left in the wake of the advancing FSW tip cools to form a weld. The FSW tip can also be a tool without a pin so that the shoulder is processing another material through FSP.

FIG. 1 is a perspective view of a tool being used for friction stir welding that is characterized by a generally cylindrical tool 10 having a shank 8, a shoulder 12 and a pin 14 extending outward from the shoulder. The pin 14 is rotated against a workpiece 16 until sufficient heat is generated, at which point the pin of the tool is plunged into the plasticized workpiece material. Typically, the pin 14 is plunged into the workpiece 16 until reaching the shoulder 12 which prevents further penetration into the workpiece. The workpiece 16 is often two sheets or plates of material that are butted together at a joint line 18. In this example, the pin 14 is plunged into the workpiece 16 at the joint line 18.

FIG. 2 is a cross-sectional view of the tool 10. A collar 22 is shown gripping both the shank 8 and the FSW tip 24, wherein the FSW tip is comprised of the shoulder 12 and the pin 14. As the tool 10 is rotated, torque is transmitted from the rotating shank 8 to the collar 22 and then to the FSW tip 24. When the tool 10 is being used on a workpiece that is a high melting (or softening) temperature material such as steel, the FSW tip 24 is in many situations exposed to temperatures in excess of 1000 degrees C. as it is rotated while traversing steel softened by frictional heating.

Referring to FIG. 1, the frictional heat caused by rotational motion of the pin 14 against the workpiece material 16 causes the workpiece material to soften without reaching a melting point. The tool 10 is moved transversely along the joint line 18, thereby creating a weld as the plasticized material flows around the pin from a leading edge to a trailing edge along a tool path 20. The result is a solid phase bond at the joint line 18 along the tool path 20 that may be generally indistinguishable from the workpiece material 16, in contrast to the welds produced when using conventional noon-FSW welding technologies.

It is observed that when the shoulder 12 contacts the surface of the workpieces, its rotation creates additional frictional heat that plasticizes a larger cylindrical column of material around the inserted pin 14. The shoulder 12 provides a forging force that contains the upward metal flow caused by the tool pin 14.

During friction stir welding, the area to be welded and the tool are moved relative to each other such that the tool traverses a desired length of the weld joint at a tool/workpiece interface. The rotating friction stir welding tool 10 provides a continual hot working action, plasticizing metal within a narrow zone as it moves transversely along the base metal, while transporting metal from the leading edge of the pin 14 to its trailing edge. As the weld zone cools, there is typically no solidification as no liquid is created as the tool 10 passes. It is often the case, but not always, that the resulting weld is a defect-free, re-crystallized, fine grain microstructure formed in the area of the weld.

Travel speeds are typically 10 to 500 mm/min with rotation rates of 200 to 2000 rpm. Temperatures reached are usually close to, but below, solidus temperatures. Friction stir welding parameters are a function of a material's thermal properties, high temperature flow stress and penetration depth.

Previous patents have taught the benefits of being able to perform friction stir welding with materials that were previously considered to be functionally unweldable. Some of these materials are non-fusion weldable, or just difficult to weld at all. These materials include, for example, metal matrix composites, ferrous alloys such as steel and stainless steel, and non-ferrous materials. Another class of materials that were also able to take advantage of friction stir welding is the superalloys. Superalloys can be materials having a higher melting temperature bronze or aluminum, and may have other elements mixed in as well. Some examples of superalloys are nickel, iron-nickel, and cobalt-based alloys generally used at temperatures above 1000 degrees F. Additional elements commonly found in superalloys include, but are not limited to, chromium, molybdenum, tungsten, aluminum, titanium, niobium, tantalum, and rhenium.

It is noted that titanium is also a desirable material to use for friction stir welding. Titanium is a non-ferrous material, but has a higher melting point than other nonferrous materials. The previous patents teach that a tool for friction stir welding of high temperature materials is made of a material or materials that have a higher melting temperature than the material being friction stir welded. In some embodiments, a superabrasive was used in the tool, sometimes as a coating.

The embodiments of the present invention are generally concerned with these functionally unweldable materials, as well as the superalloys, and are hereinafter referred to as "high melting temperature" or "high softening temperature" materials throughout this document. Nevertheless, the tool to be taught herein can also be used in less harsh friction stir welding environments when low melting temperature materials are being used.

The present invention is useful for tools being used in many applications, but most especially when performing friction stir processing of high melting temperature materials.

Small diameter tubes (including casing and pipes) often require mechanically fastened connectors, often made of dissimilar materials, to maintain a seal over a wide temperature range. As a result, the joint is prone to leaking due to extreme temperature gradients as the two materials expand or contract at different rates. Tubular systems that transport liquid natural gas are one example of mechanical components that must function over an extreme temperature range.

High Melting Temperature Friction Stir Welding Tool

In conjunction with the problems associated with the creation of materials that require liquid to solid phase transformation, advancements in friction stir welding technologies have resulted in tools that can be used to join high melting temperature materials such as steel and stainless steel together during the solid state joining processes of friction stir welding.

The tool is effective at friction stir welding of various materials. The tool design is also effective when using a variety of tool tip materials besides polycrystalline cubic boron nitride (PCBN) and polycrystalline diamond (PCD). Some of these materials include refractories such as tungsten, rhenium, iridium, titanium, molybdenum, etc.

As explained previously, friction stir welding is a solid state joining process that uses a rotating tool to generate frictional heat as the tool traverses a joint line between two metal bodies positioned adjacent to each other. This method for joining provides a superior joint over fusion welding processes that first melt and then solidify the bodies being joined.

The FSW equipment used to join high melting temperature materials has two predominant control options; axial or Z axis load, and axial or Z axis position. These two control options are used with tool traverse speed and tool rotational speed during the FSW process to produce a friction stir welded joint. Generally, all four of these variables (Z axis load, Z axis position, tool traverse speed, and tool rotational speed) are independent of each other and are controlled by closed loop feedback algorithms programmed to a specified set point. Most of the applications in FSW production at this time are comprised of aluminum friction stir welded components where minor operator intervention is required during the production FSW process. In most aluminum applications, FSW is a forgiving process where the flow and ductility of aluminum are high and the heat generated during the FSW process is quickly transferred away from the tool path because of aluminum's high thermal conductivity.

As FSW is progressing into high strength, high melting temperature materials applications, the process window to create a defect free reliable joint is much smaller than aluminum. This smaller window is due to steeper temperature gradients around the tool, relatively low thermal conductivity of the materials being joined, high flow stresses, and lower material ductility.

The steeper temperature gradients are a result of low material thermal conductivity combined with higher temperatures required to plasticize material flow around the tool. In aluminum, heat transfer is predominantly through the material while in high melting temperature materials such as steel, the heat flows through the material, the back side of the material, is reflected internally from surfaces and interfaces and through the tool. In addition, the thermal and mechanical loads applied to the tool during FSW are extreme, and precision process control is required to not only prevent tool failure by wear or breakage, but in order to create predictable and consistent joint properties.

The controls and process criteria for FSW of low temperature materials such as aluminum are insufficient to manage the critical and dynamic process around the tool during FSW of high melting temperature materials. The problem of performing FSW of high melting temperature materials is made even more difficult when the workpieces are small diameter tubing because as the tube diameter gets smaller, the heat input into the weld becomes more sensitive because there is less material to act as a heat sink. Accordingly, a novel approach must be taken to ensure steady state processing of small diameter tubing.

Tool Geometry and the Function of the Tool

Another aspect of the present inventions is directed to the geometry of the tool itself. Tool geometry refers to surface features that can be disposed on a pin and/or shoulder of the FSW tool to affect function and performance. The prior art teaches numerous tool geometries for friction stir welding of low melting temperature materials such as aluminum alloys. These tool geometries that can be classified as "aggressive" are almost exclusively for low melting temperature material applications. That is because tools for FSW of high melting temperatures have a superabrasive coating that would quickly fail if they had the surface features commonly found on these aggressive prior art tools. The stress on a superabrasive coating on a tool used to join or process high melting temperature materials such as steel, stainless steel, and nickel base alloys is much higher than on tools used for low melting temperature materials such as aluminum and copper.

Tool geometries that were developed for low melting temperature material applications are considered to be too aggressive for high melting temperature material applications. Aggressive surface features include but are not limited to sharp angles, coarser threads, large spiral steps, larger radial flats, and fins that resemble air foils that extend radially from the tip of the pin.

One of the main functions of tool geometry is to cause a stirring action of the workpiece material. The stirring action is useful in transferring material to or way from the tool. Stirring action is increased by creating pin and/or shoulder geometries that include aggressive surface features. Stirring action is also an important parameter that has special significance when performing FSW on small diameter tubing.

There are several reasons for the past differences in the surface features on FSW tools used in low melting temperature and high melting temperature materials. First, some of the aggressive surface feature geometries commonly used on low melting temperature materials are not considered to be technically feasible. Specifically, the strength of the tool material is exceeded during solid state processing of high melting temperature materials.

Second, there is a tendency for aggressive surface features to remain engaged in the high melting temperature material. Consequently, a pin will often break off and remain in the high melting temperature material when the FSW tool is retracted, resulting in a failed weld and broken FSW tool.

Third, the thermal conductivity of the most common low melting temperature materials (such as aluminum and copper) is greater than that of the tool (typically tool steel). In contrast, the thermal conductivity of the high melting temperature materials is generally lower than that of the FSW tools used in the welding.

Fourth, the coefficient of friction between the FSW tool and the workpiece is different. For low melting temperature materials, the coefficient of friction is high, while it is low for high melting temperature materials. This factor significantly changes the heat generation of the FSW process, which has important considerations for tool design.

In summary, most tool geometries used in FSW are designed for flat surfaces and low melting temperature materials. As the diameter of the tube gets smaller, these tool geometries tend to undercut the weld or do not allow the friction stir welded joint to consolidate. Specific considerations for small diameter tubing must also be made for tool design.

Out of Position Friction Stir Welding of Small Diameter Tubing

There is a substantial need for performing radial and longitudinal welds of non-planar surfaces. There are now various devices that enable friction stir welding on objects such as pipes, flanges, tanks, and shrouds. These system use an active or passive mandrel to provide support for the friction stir welding process.

However, there are many applications in the petrochemical, oil and gas, power, nuclear, paper, chemical and other industries that require the use of small diameter tubing to transport liquids, gases and semisolids as well as structural components. There are a variety of materials used for tubing and pipe which include stainless steels, nickel base alloys, and ferritic steels to name a few. Conventional welding practices have been used to join many of these materials together; however there are many applications where welding cannot be used because of environmental concerns or where non-weldable materials must be used because of their material properties requirements. Mechanical joints are used instead of welded joints in these applications. Threaded joints or flanges are typical methods for mechanically attaching ends of pipe.

An example of a mechanical joint would be in a tubular system called casing that is used in the oil and gas industry. As a hole is drilled in a geological formation, tubular casing is inserted down the hole to stabilize and seal the earth formation from the products extracted from the earth. Casing is positioned after a section of the hole has been drilled and then drilling commences once that portion of the hole is set with casing. Smaller diameter casing is used for the next section since a smaller drill bit must pass through existing casing and drill the next section of hole. The casing is threaded on each end and screwed together as it is inserted into the hole. The threaded joints create a problem because casing ends must be larger in diameter to accommodate both male and female threads and are prone to bending or kinking at the joint as they are inserted down the hole. This is a greater problem for those holes being drilled off shore in great depths of water where an entire casing string may have to be retrieved if a joint bends or fails during casing installation.

A newer casing technology involves expanding the casing after it has been inserted down the hole. This technology increases the size of the hole and reduces the number of casing diameters required to complete a hole, and the depth that can be drilled. A drawback to this technology is the expanded joint of the casing is even more prone to leaking than threads that are not expanded. Conventional welding is not an option because the elongation of the weld is less than the original pipe material.

For those applications where mechanical joints are not practical, joining tube or pipe with conventional welding methods, including TIG, MIG, Oxy-Acetylene, Stick, etc., have been a common practice for decades. All of these methods use high energy either from electricity or combustible gasses to melt the joint of two or more tubes butted together. During this process the metals melt together and solidify. As the materials solidify a heat affected zone forms between the material that has been melted and the base metal. This heat affected zone is usually softer and weaker than the base material. It is also prone to solidification defects which include cracks, porosity and unfavorable phases in the material's microstructure.

In many cases, a higher strength filler metal is used during the welding process to improve the strength of the joint. Unfortunately, the addition of higher strength filler metals causes the solidified filler metal to be harder than the tube base material which further increases the difference in hardness between the filler material and the base material. This difference becomes a stress raiser where cracks initiate and failure occurs.

Another difficulty with welding tube or pipe is uneven weld joint thickness that results from the gravitational effects on the flow of the molten material during the welding process. In fact, organizations that certify weld quality such as the API (American Petroleum Institute), accept that all welds using these conventional weld methods are allowed to contain imperfections. These imperfections are cracks, defects, porosity, and other anomalies that naturally occur due to all of the variables inherent to these welding methods. An imperfection is considered a defect when it reaches a certain size. As a result, pipe and tube system design engineers are forced to over design pipe and tube configurations with thicker cross sections to account for "imperfections" and lower strength at the weld joint. It is typical for a design engineer to accept weld joint strength at 40% of base metal properties.

Friction stir welding is well documented in literature as an improved means to join materials together. There are no solidification defects and no filler metals are required for FSW. The process utilizes 27 times less energy than the conventional methods listed above.

As explained previously, a FSW process uses a rotating tool to generate sufficient heat to plasticize and join material together whether the workpieces are planar or non-planar. An axial or Z tool force is required to plunge the rotating tool into the material and maintain a load. A transverse or X force is also applied to the tool as it travels through the joint as it softens and stirs the material together. A rotational torque is also applied on the tool during the FSW process.

Small diameter tubing is defined in this document as having an inside diameter of 16 inches or less but is more often going to be about 9 inches. As the diameter of the tubing gets smaller, the contact area available to hold the tubing and resist the forces applied by the tool also decreases. The forces applied by the tool, however, do not decrease, thereby making it even more difficult to hold the tube during FSW. In addition, the moment of inertia of the tube decreases by the forth power as the diameter decreases linearly. This means the tube will tend to buckle due to the Z load of the tool as it is applied normal to the joint.

As the tube wall gets thinner, the transverse strength of the tube is also decreased. As the tube diameter gets smaller, the same z force must be reacted against a smaller mandrel required to fit inside the tube.

Internal Mandrel for Use in FSW of Small Diameter Tubing

Friction stir welding on arcuate surfaces often requires the use of a counter-balancing force against the inside of the arcuate surface being welded. Without a counter-balancing force, the arcuate surface can be damaged by the forces applied by the FSW tool.

The present invention is directed to FSW of arcuate surfaces including but not limited to small diameter casings, pipes and tubes where the curvature of the arcuate surfaces is large compared to the size of the FSW tool. There are unique problems associated with FSW of small diameter tubing as compared to large diameter tubing. These problems are not addressed by internal mandrels used in the prior art.

FSW has already been established as a viable technology for joining large diameter tubing or pipe segments. An example of a friction stir welding machine 50 that can join large diameter pipe segments is shown in FIG. 3. A rotating tool plunges into a joint between two pipes as it creates frictional heat. Once the tool has plunged into the workpieces, the tool is caused to travel circumferentially around the pipes while the joint is "stirred" together. The FSW tool is then retracted and the machine 50 is moved along the pipe to the next pipe joint to be welded.

The friction stir welding machine 50 shown in FIG. 3 illustrates a machine that operates on the exterior of the pipe being welded. When the thickness of the workpieces is small in comparison to the forces being applied, it is necessary to provide a counter-balancing force on the back side (opposite the tool) of the workpieces being joined. Without a counter-force, the workpieces can suffer deformation. In a small diameter tube, an internal mandrel is required to support the inside of the tube being joined during FSW because Z axis tool loads are quite high—generally 4000 to 8000 pounds applied over a one inch FSW tool diameter.

FIG. 4 is an illustration of a mandrel that is found in the prior art. The mandrel 36 includes a system for providing a force against the ID of the tube. Another feature that may be included is a system for moving the mandrel along the inside of the tube so that it can be positioned where needed.

Inventions for Small Diameter Tube

The problems associated with FSW of an arcuate surface for a large diameter are well known to those skilled in the art. However, there are unique problems that arise when performing FSW of small diameter tubing. The present invention applies to these and other out of position friction stir welding processes. Therefore, it would be an advantage over the prior art to provide 1) a system and method for holding a small diameter tube so that FSW can be performed thereon, 2) a new tool geometry having surface features that enable FSW of small diameter tubing, and 3) a new mandrel that can be used in small diameter tubing.

BRIEF SUMMARY OF THE INVENTION

The present invention is a system and method for performing friction stir welding on high melting temperature materials when these materials are used in casing, pipe, tubing and other arcuate surfaces having a small diameter compared to the size of the friction stir welding tool, wherein the system includes aggressive surface features on a friction stir welding tool, modified process parameters when using the new tool, a new system for holding the small diameter tubing when large forces are being applied, and a new internal mandrel.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The present invention describes a system and method for holding a small diameter tube in a correct position with a firm grasp sufficient to perform FSW when the tube is comprised of high melting temperature materials. The small diameter tubing can be rotated by a positioning and holding system while a FSW tool is held stationary, or vice versa. Various embodiments of internal mandrels are also described which can fit inside the smaller dimensions of the small diameter tubing and expand to provide a counter force to prevent deformation of the tubing when forces are applied by the FSW tool.

New FSW tool geometries are also described which enable the FSW tool 100 to direct more heat on a tool/workpiece interface to counteract a lack of contact between the FSW shoulder and the workpiece. Finally, the FSW tool is carefully positioned on a small diameter tube by trailing the joint to provide desirable heating at the joint/workpiece interface and surface finishing.

A first embodiment of the present invention is a system and method that performs out of position friction stir welding of arcuate surfaces made from high melting temperature materials. More specifically, the present invention addresses the unique problems that arise when performing FSW on small diameter tubing.

The present invention was developed in response to a need in industry for performing FSW on small diameter casing, piping and tubular objects manufactured from high melting temperature materials that are being used in the oil and gas exploration and transportation industries. However, the present invention is adaptable for any application where a small diameter tubular object requires friction stir welding, and especially when the materials being welded have a high melting temperature.

Figure 5:
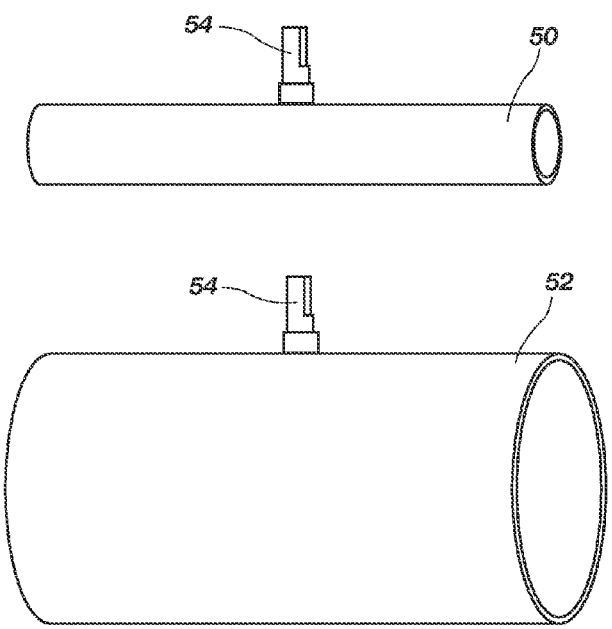
FIG. 5 is a perspective illustration of a small diameter tube and a large diameter tube.

FIG. 5 is a perspective illustration of a friction stir welding tool engaged with a small diameter tube 50 and a large diameter tube 52. For the purposes of this document, there may be an overlap in the definition of what is small and what is large diameter tubing. However, it is believed that the present invention will function adequately for tubing up to 16 inches in diameter. The user will need to determine which type of system is best for their application based on the characteristics of the workpieces that are being FSW.

Figure 1:
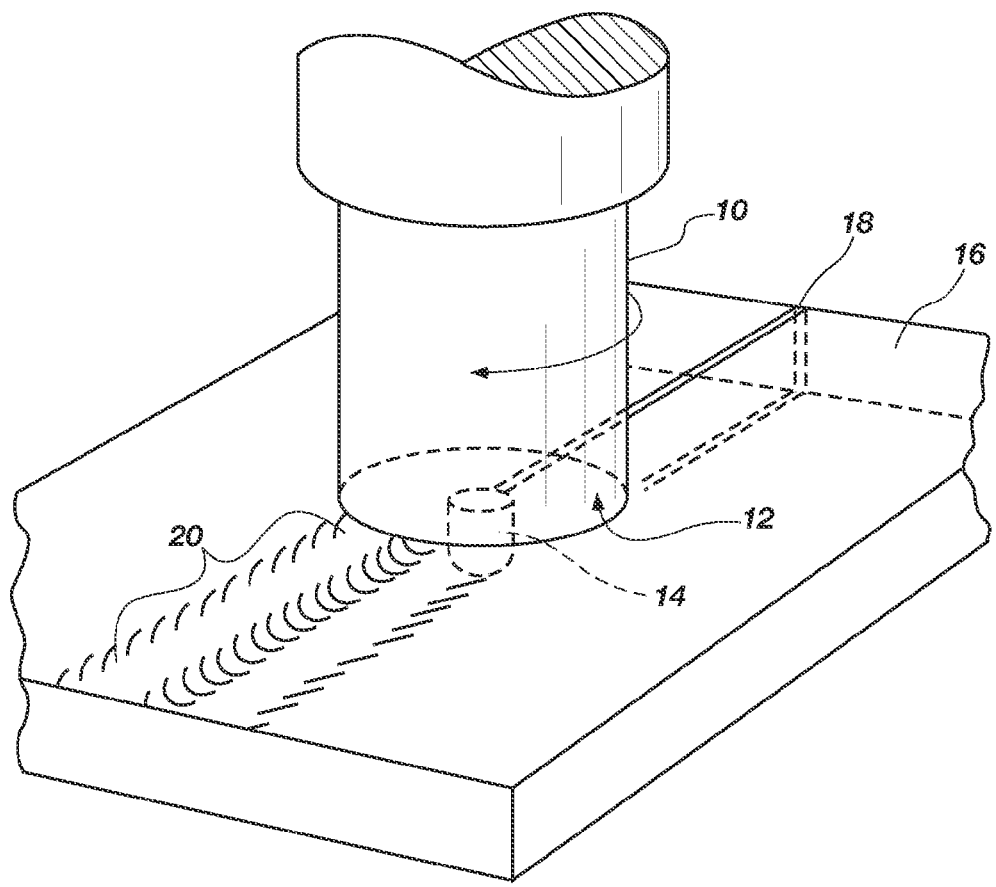
FIG. 1 is an illustration of the prior at showing friction stir welding of planar workpieces.
Figure 2:
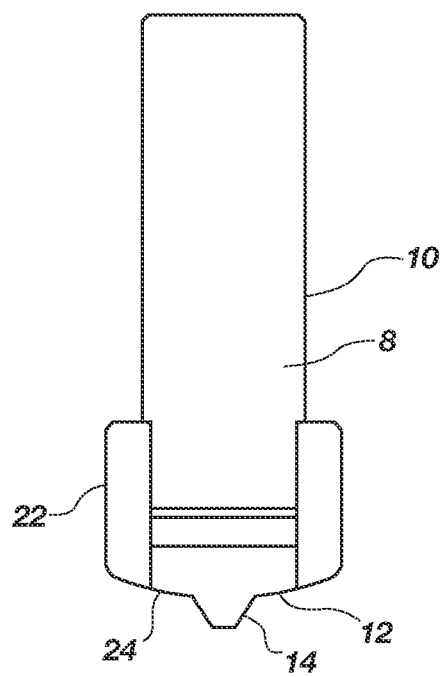
FIG. 2 is a cross-sectional view of a tool performing friction stir welding on a planar surface using prior art technology.
Figure 3:
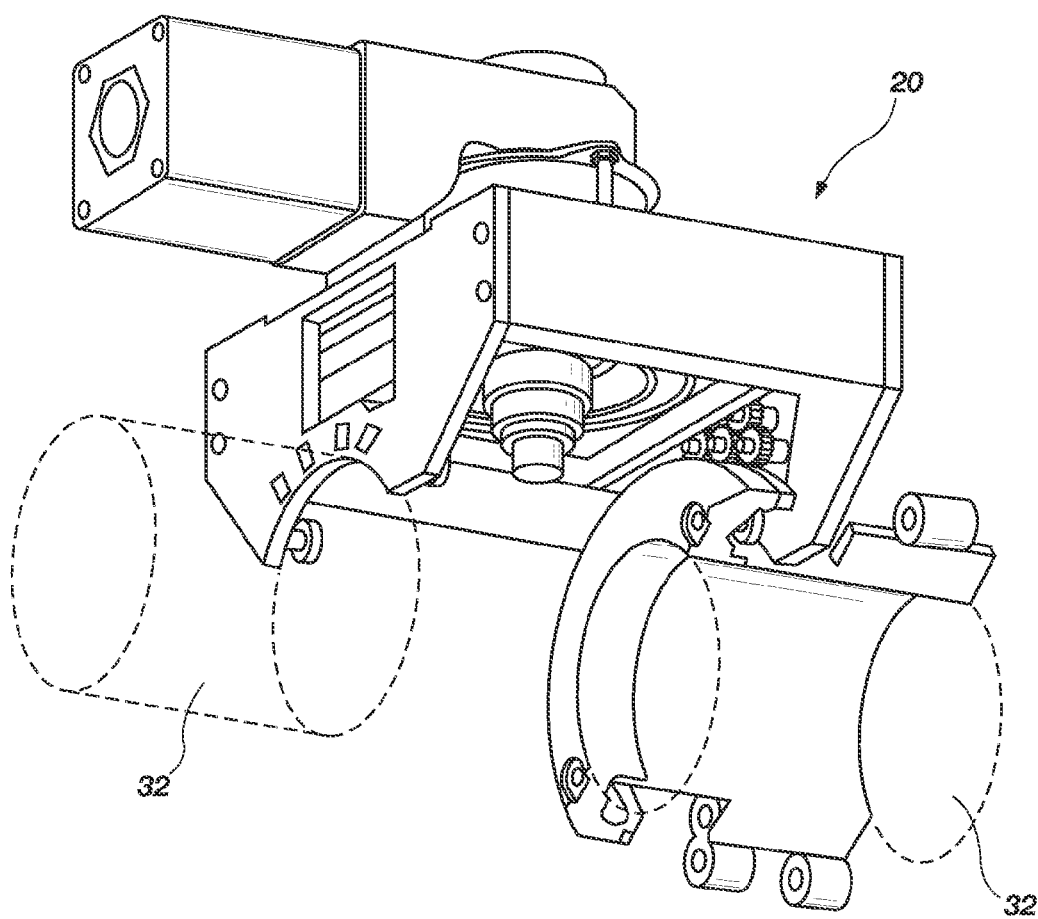
FIG. 3 is a friction stir welding machine that can join large diameter pipe segments using prior art technology of large clamps that are positioned to hold the two tubes for FSW.
Figure 4:
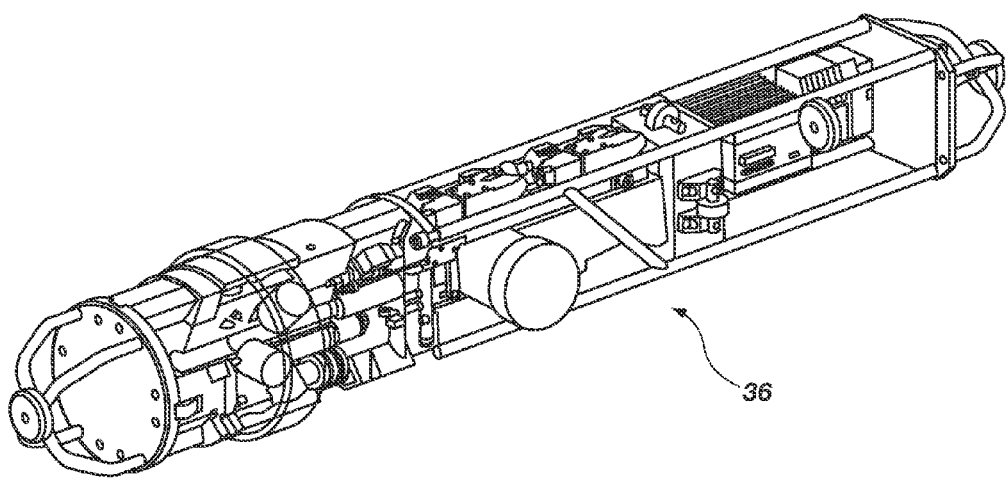
FIG. 4 is an illustration of a mandrel that is found in the prior art.

The prior art systems for friction stir welding high melting temperature large diameter tubing typically used a system of large clamps that positioned and then held the two tubes as shown in FIG. 3. FSW of tubing requires that either the tool move around the circumference of the tube or the tool be held stationary and the tube rotate. Regardless of which component rotates, the forces must be coupled through the tube by a holding mechanism in order to react the forces applied by the FSW tool.

The prior art demonstrates that large diameter tubing is rotated using very heavy turntables and gearing systems with multiple clamps and/or flange bolts to react these forces. These turntables or rotary drive fixtures do not have a through-hole in the center to allow for long lengths to be welded because there is no need for one. Furthermore, a bearing system would be cost prohibitive. It has not been practical nor has it been possible to apply these clamping forces on a small tube even though the forces required to friction stir weld are the same.

For FSW to be performed correctly, the tube must be held concentric with respect to the position of the FSW tool to assure uniform tool penetration at the joint being friction stir welded. If the tube is off-center or eccentric, then partial penetration of the welds may cause root defects on the inside of the tube.

Figure 6:
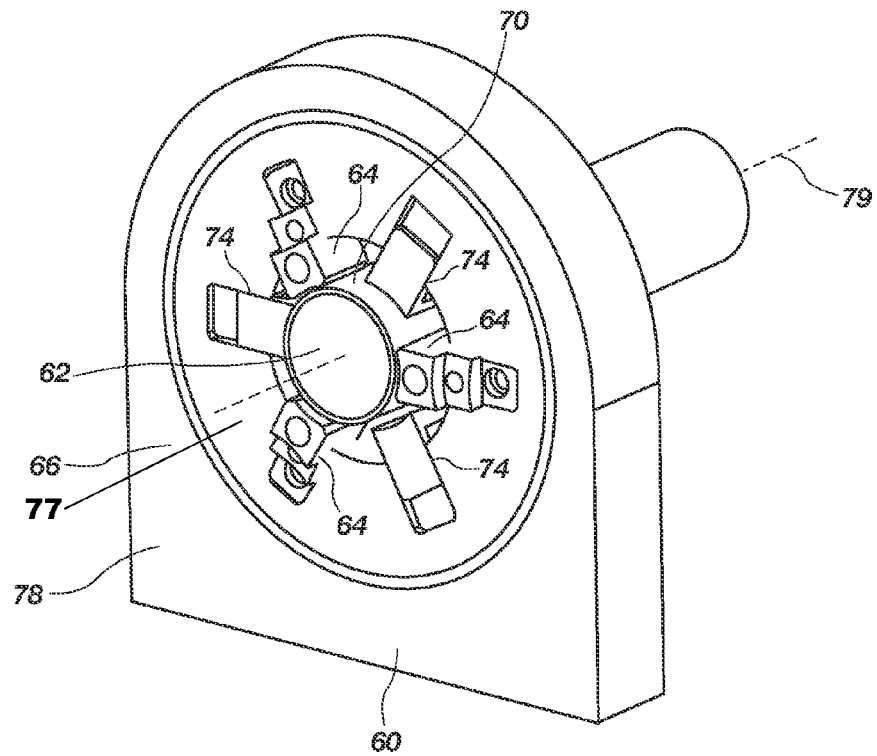
FIG. 6 is a perspective view of a Rotary Clamping and Positioning Fixture (RCPF) for small diameter tubes.

FIG. 6 shows a first embodiment of a solution to the problems of adequate gripping strength on the small diameter tube, and precise positioning of the tube with respect to the FSW tool. FIG. 6 shows a first side 66 of a Rotary Clamping and Positioning Fixture (RCPF) 60 for small diameter tubes.

The RCPF provides a through-hole 62 to allow for long lengths of tube to be friction stir welded. Three mechanical jaws 64 are provided for precision positioning of a tube 70. The mechanical jaws 64 can be closed manually or automatically around the tube 70. Closing the mechanical jaws 64 is performed on a second side 68 of the RCPF 60.

Figure 7:
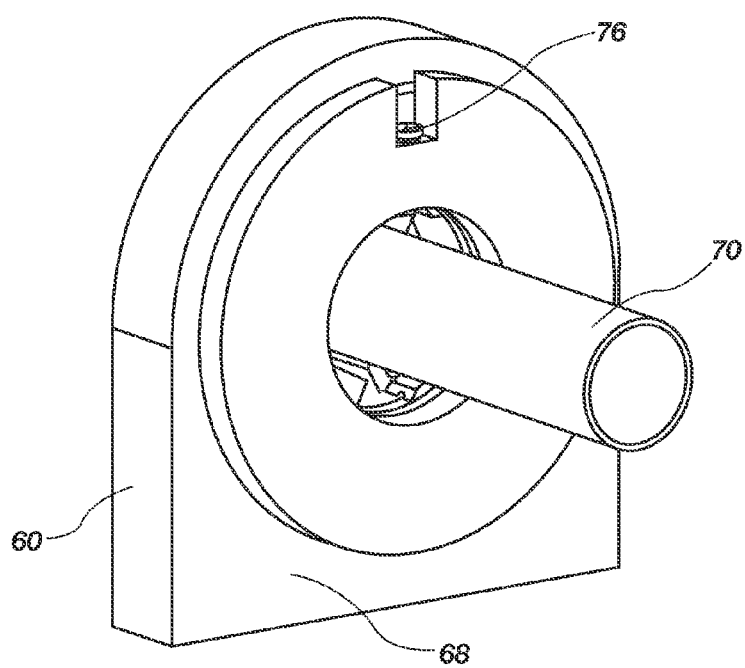
FIG. 7 is a perspective view of the second side opposite the first side of the RCPF of FIG. 6.

FIG. 7 is an illustration of the second side 68 opposite the first side 66 of the RCPF 60. The second side 68 shows a drive pinion 76 that is used to adjust the three mechanical jaws 64. When a circular workpiece such as tube 70 is to be clamped, it is common practice to use a three jaw clamping system in which the jaws are self-centering. In this manner adjustment of one jaw 64 causes adjustment of the other two jaws to ensure that the jaws move equally. It thus becomes a simple exercise to locate a circular workpiece centrally of the jaws 64. The system for tightening the jaws 64 around a circular workpiece comprises a circular scroll that is rotatably actuated within a housing 72, the circular scroll being driven by at least one key operated drive pinion 76.

While three mechanical jaws 64 are described above, the number may be adjusted. However, three mechanical jaws are commonly used in this type of application where precise centering by self-centering jaws is required.

In FIG. 6, it is also shown that the three mechanical jaws 64 are assisted by three hydraulic jaws 74. Once the tube 70 is clamped by the mechanical jaws 64 and in position, the hydraulically activated jaws 74 apply the additional forces needed to ensure that the tube 70 will not move or spin within the jaws 64, 74. While hydraulic jaws are available on CNC type machining equipment, they lack the force requirements needed in FSW applications.

A problem in many FSW applications is that the jaws must be able to open far enough to accommodate different cross sectional diameters of the tubes that must pass through the center of the RCPF 60. Hydraulic jaws 74 have a very limited stroke that is required to maintain concentricity within the jaws 64, 74. The clamping system of the present invention thus allows for much larger diameter tubes to pass through the center through-hole 62 while having the flexibility to clamp onto smaller cross sectional diameter tubes.

FIG. 6 also shows that the mechanical jaws 64 and the hydraulic jaws 74 are disposed within an inner clamping ring 77. The inner clamping ring 77 is held by a stationary housing 78. The stationary housing is in turn mounted to a FSW machine. The FSW machine can be operated in a vertical or horizontal configuration, thereby enabling the FSW process to be flexible regarding its applications.

Importantly, the inner clamping ring 77 is free to rotate, enabling the tube 70 within the jaws 64, 74 to rotate around a central axis 79 of the tube and RCPF 60. In this embodiment, rotation of the inner clamping ring 77 is driven by a spur gear, but any adequate system can be used. Hydraulic oil lubrication is used on a sliding friction bearing surface as the inner clamping ring 77 rotates within the housing 78.

Properly positioning and then holding a small diameter tube 70 was determined through experimentation not to be a trivial matter. It requires the combination of self-centering mechanical jaws 64 in combination with the force of the hydraulic jaws 74 to enable FSW with the applied forces of the FSW tool.

Use of the RCPF 60 to hold small diameter tubes can be independent of an internal mandrel that will resist deflection if the wall thickness and cross sectional area of the tube are sufficient on their own to resist the FSW tool forces. An example of a situation not requiring a mandrel would be to friction stir weld a threaded joint of casing used in a drilling application, such that the weld forms a seal and the thicker threaded portion provides an increased moment of inertia to resist wall failure during FSW. Thus, a thicker wall of the tube can eliminate the need for a countering force within. In other cases, a mandrel is necessary to prevent deflection of the tube and resist the torque which results from rotation of the RCPF 60.

It was previously explained that an inner mandrel is used to support large diameter tubes. The mandrels described in the prior art, such as in co-pending application Ser. No. 11/244,824, are too large to fit within the lower range of small diameter tubes that are the welding object of the present invention, but is adaptable for the larger diameter range of tubes. Therefore, it is necessary to provide a new mandrel design that can be used in the smaller diameter range.

The mandrel is required to support the inside of the tube being joined during FSW if the walls of the tube cannot withstand the FSW tool forces. Typically, Z axis tool loads are 4000 to 8000 pounds applied over a common FSW tool having a one inch diameter.

Figure 8:
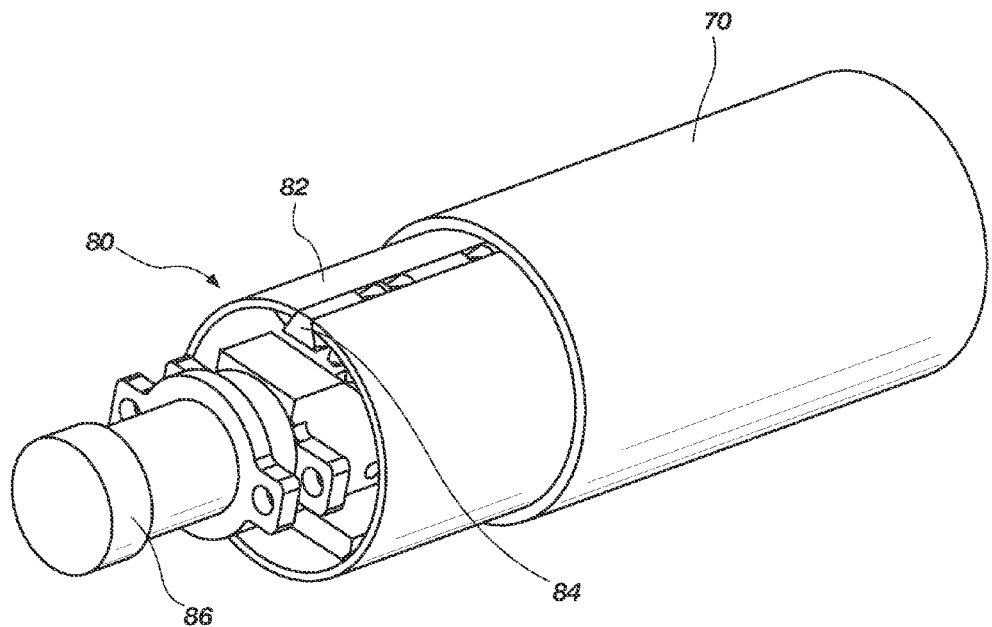
FIG. 8 is a perspective illustration of a first embodiment of a new internal mandrel small enough to be inserted into a tube to be welded.

FIG. 8 is a perspective illustration of a first embodiment of a new internal mandrel 80. The mandrel 80 requires a diameter small enough to be inserted into a tube 70 to be welded. In this embodiment, the mandrel 80 includes an expansion shell 82 and a radially moving expansion wedge 84 that is pushed towards the ID of the tube 70 to thereby enable the expansion shell 82 to make contact with the ID of the tube. The expansion wedge 84 is caused to move radially through activation of a hydraulic cylinder 86.

The size of the expansion wedge 84 can be altered to change the operation of the mandrel 80. A larger expansion wedge forces the expansion shell 82 to open wider, if possible. A smaller expansion wedge 84 will not force open the expansion shell 82 with the same force.

Figure 9:
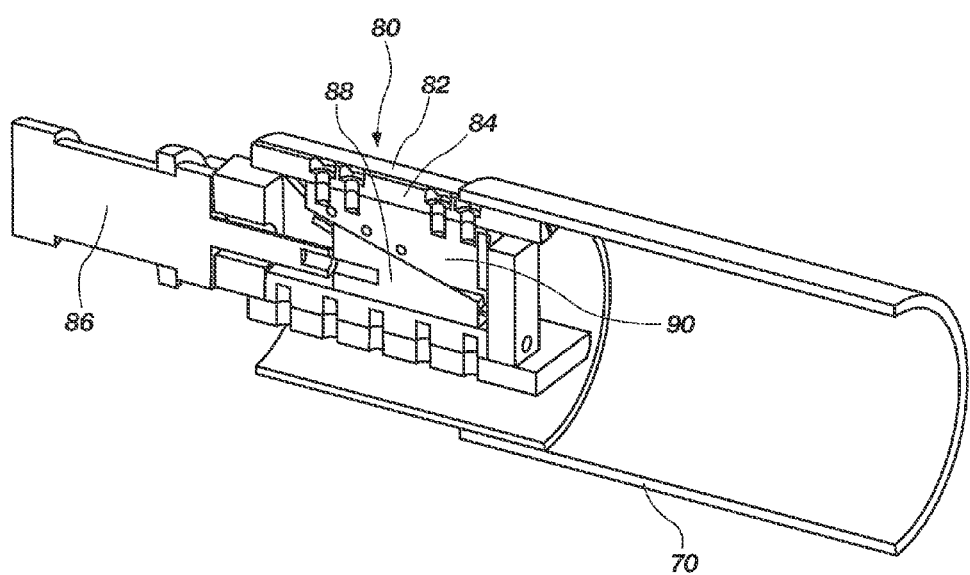
FIG. 9 is a cut-away perspective view of the internal components of the mandrel of FIG. 8.

FIG. 9 is a cut-away perspective view of the internal components of the mandrel 80. Movement of the hydraulic cylinder 86 applies force against a double-wedge assembly. A first wedge 88 is shown as pushed forward into the tube 70. The first wedge 88 transfers this applied force against a second wedge 90. It is necessary for the first wedge 88 and the second wedge 90 to be able to slide past each other in order for the second wedge 90 to push against the expansion wedge 84. The expansion wedge 84 causes the expansion shell 82 to be forced open until making contact with the ID of the tube 70. The expansion shell 82 provides the necessary force to prevent deformation of the tube 70 when the FSW tool is applied.

The expansion shell 82 should have a hardness of between 12 and 75 Rockwell C. It is also important for the expansion shell 82 to have a coating to prevent diffusion bonding between the expansion shell and a workpiece.

The expansion shell 82 should include relief cuts that are made on the inside diameter of the expansion shell so that the expansion shell can spring and flex at the locations of the relief cuts. Once the expansion shell 82 is machined, lips may also be welded into place on the inside diameter of the expansion shell immediately adjacent to the gap.

Once the lips have been welded into place, the expansion shell 82 is further modified so that the gap is naturally in a closed position when there is no external force being applied to the expansion shell. This closing of the gap is accomplished by running a fusion weld bead, as is known to those skilled in the art, parallel to the length of the relief cuts, and in equiangular positions relative to each other. In other words, enough weld beads are disposed on the inside of the expansion shell 82 in uniform locations to distort the expansion shell so that the gap is closed as a result of the residual stresses caused by the solidifying weld beads. Thus, the expansion shell 82 now springs back to a closed position if the gap is forced apart.

The materials used in the first and second wedges 88, 80 must not only be capable of being pushed against each other, but also sliding past each other. Those skilled in the art understand that some ceramics and cermets are sufficiently hard so as to provide this capability. For example, TOUGHMET® can perform this function.

Figure 10:
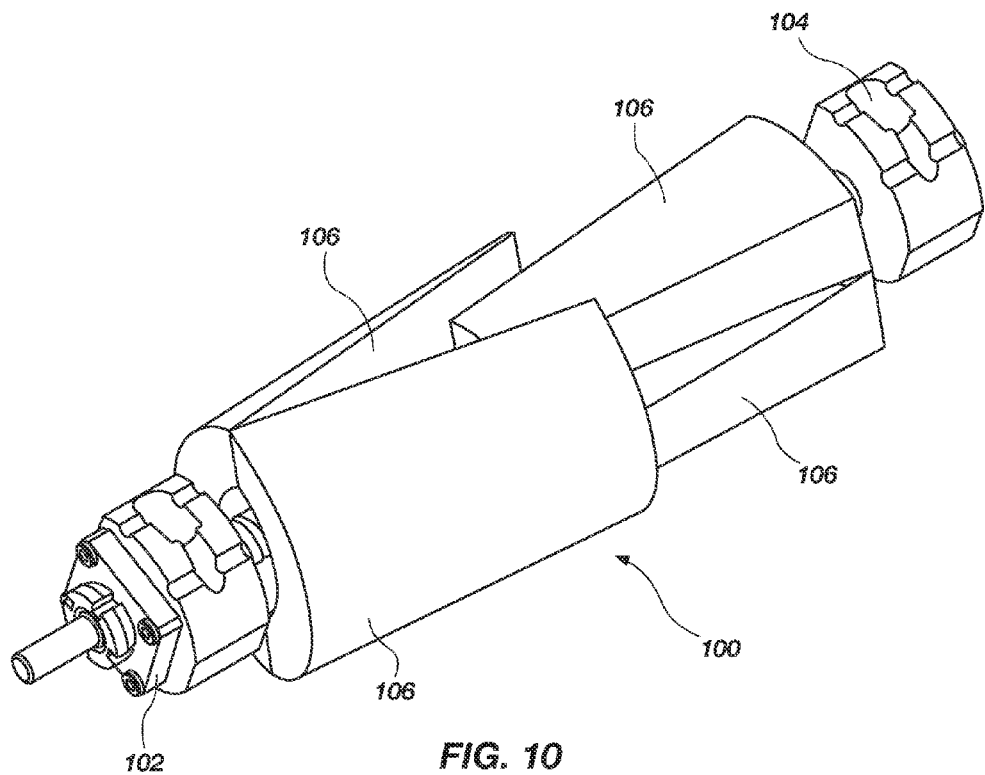
FIG. 10 is a perspective view of a different mandrel that includes a drive end ball screw, a tightening nut, and four independent spring loaded expansion shells.

In an alternative embodiment, FIG. 10 shows a perspective view of a different mandrel 100. In this figure, the mandrel 100 is in an open configuration that is ready for loading into the tube 70. The mandrel 100 includes a drive end ball screw 102, a tightening nut 104, and four independent spring loaded expansion shells 106. The mandrel 100 is inserted into a tube 70 beginning at the end opposite the tightening nut 104.

Figure 11:
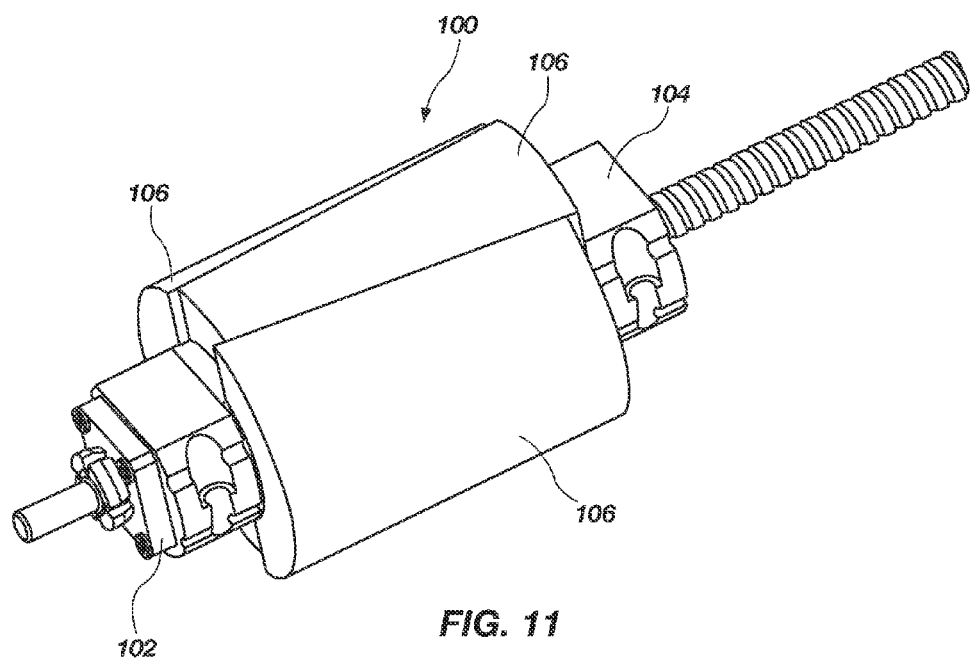
FIG. 11 is a perspective illustration of the mandrel in a closed configuration wherein the tightening nut has been turned, causing the sides of the four independent spring loaded expansion shells to slide past each other in an interlocking arrangement.

FIG. 11 is a perspective illustration of the mandrel 100 in a closed configuration wherein the tightening nut 104 has been turned, causing the sides of the four independent spring loaded expansion shells 106 to slide past each other in an interlocking arrangement, and thus expand outwards as shown. The outer surfaces of the four independent spring loaded expansion shells 106 are thus pressed against the ID of the tube 70 to prevent tube deformation.

Figure 12:
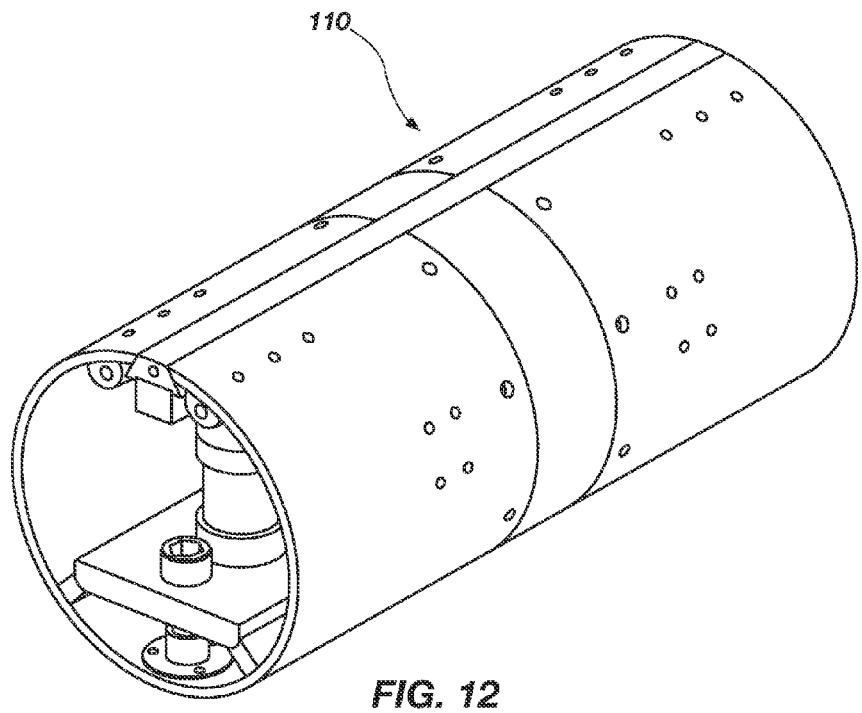
FIG. 12 is a perspective view of the OD of a modified mandrel.

A final alternative embodiment of an internal mandrel is shown in FIG. 12. FIG. 12 is a perspective view of the OD of the mandrel 110. Mandrel 110 is a modified version of the mandrel taught in co-pending application Ser. No. 11/244,824 (now allowed), and the application is incorporated herein by reference.

The mandrel 110 includes an expanding shell 112, an expansion wedge 114, at least two radial acting cylinders 116 for applying a force on the expansion wedge, radial acting cylinders 118 for acting on the expansion shell itself, and an interchangeable section 120 of the expansion shell. The interchangeable section 120 should also include a coating to prevent diffusion bonding with a workpiece.

The new elements of the mandrel 110 are the interchangeable section 120 of the expansion shell 112, and the radial acting cylinders 118 for acting on the expansion shell.

The interchangeable section 120 provides new capabilities that are especially useful when performing FSW on small diameter tubing made from high melting temperature materials. For example, one problem that arises is the concentration of heat, and the inability of the high melting temperature materials to disperse that heat quickly. It was explained previously that the flow and ductility of low melting temperature materials are high and the heat generated during the FSW process is quickly transferred away from the tool path because of the material's high thermal conductivity.

However, as FSW is progressing into high strength, high melting temperature materials applications, the process window to create a defect free reliable joint is much smaller than aluminum. This smaller window is due to steeper temperature gradients around the tool, relatively low thermal conductivity of the materials being joined, high flow stresses, and lower material ductility.

Figure 13:
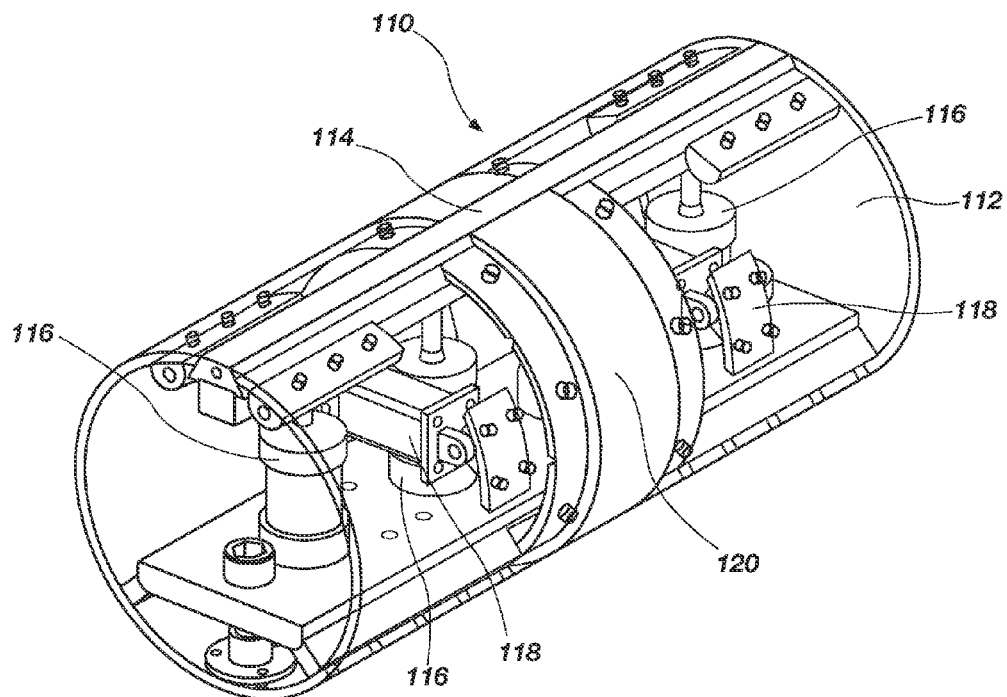
FIG. 13 is a perspective view of the mandrel taught in FIG. 12 that includes an interchangeable section of the expanding shell having heating/cooling ports.

One solution to this problem is shown in a perspective illustration in FIG. 13. FIG. 13 shows that the interchangeable section 120 of the expanding shell 112 includes heating/cooling ports 122. Using the heating/cooling ports 122, liquid heating and cooling materials can be introduced into the interchangeable section 120. Accordingly, the mandrel 110 can directly affect the temperature along a tool path on the OD of the tube 70. By altering the temperature through application of heating and/or cooling to the tool path, the quality of the resulting weld can be improved by maintaining optimum steady state process conditions.

While the interchangeable section 120 introduces a liquid heating system, other means for providing heat to the tool path can also be used, including resistive heating, etc.

The ability to provide heating and cooling directly to the tool path can also substantially influence the environments in which FSW can be performed. For example, the surrounding temperature may bring extremes of cold or heat, such as underwater or in a freezing or near-freezing environment. The mandrel 110 enables the FSW process to proceed despite environmental conditions that are not ideal.

The interchangeable section 120 brings another desirable ability to FSW of high melting temperature materials. A mandrel can be deformed by other objects or from the FSW process itself. But it is also important that the interchangeable section 120 be flush against the ID of the small diameter tube in which it is installed. The interchangeable section 120 allows for a portion of a damaged mandrel 110 to be replaced so that work can quickly continue.

A known problem with FSW of high melting temperature materials is that heat is difficult to generate at a tool/workpiece interface. This problem is due to several characteristics, including the low coefficient of friction between the tool and the high melting temperature workpiece, and the fact that it has not been possible to use aggressive surface features to generate more stirring action. This problem is now made more difficult because of an issue with the FSW tool shoulder when performing FSW on small diameter tubing.

Figure 14:
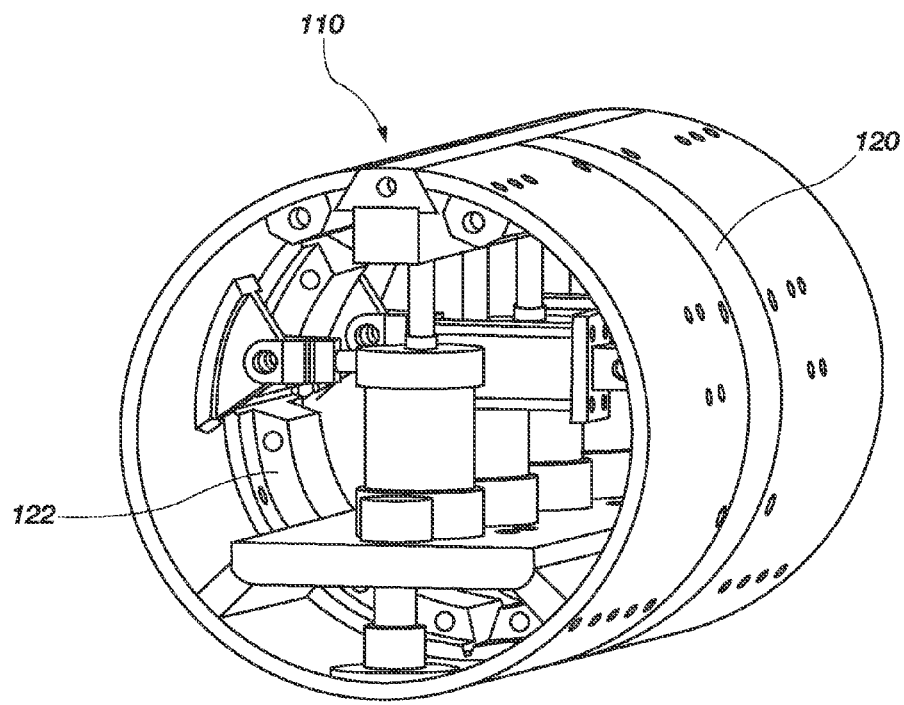
FIG. 14 is a profile view of a FSW tool which shows that the profile of the shoulder should be kept within approximately 18 degrees of being tangential to the workpiece.

FIG. 14 illustrates another aspect of the present invention. In contrast with the accepted practices for FSW of high melting temperature materials, another aspect of the present invention is to make fundamental changes to the tool geometry of the FSW tool 130. As initial FSW trials were conducted on small diameter tubes 70, it was found that typical FSW tool geometries used for planar workpieces did not function well on surfaces that had tighter or smaller radii. Therefore a first change that was made to FSW tool geometry was to use flatter shoulder profiles on the FSW tool 130 to prevent a shoulder 132 from undercutting the surface of the tubes 70.

FIG. 14 is a profile view of a FSW tool 130 of the present invention. This figure shows that the profile of the shoulder 132 should be kept within approximately 18 degrees of being tangential 134 to a workpiece. This means that the angle of the FSW tool 130 relative to a tangent 134 of the workpiece can be up to 18 degrees above and below. In the embodiment shown, the shoulder 132 is shown having an angle of approximately 9 degrees within the tangent 134.

Figure 15:
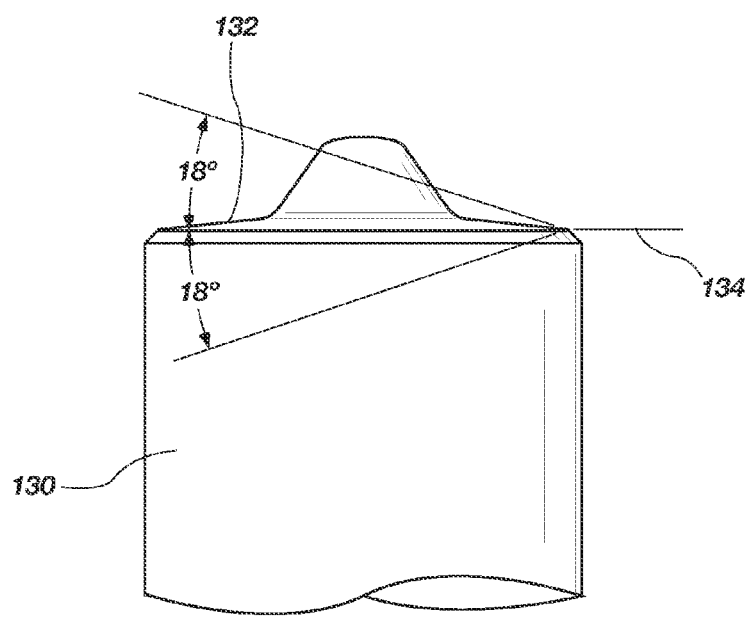
FIG. 15 is a profile view of a small diameter tube and the FSW tool, assuming that a pin (not shown) has been plunged into the small diameter tube.

FIG. 15 is a profile view of a small diameter tube 70 and the FSW tool 130. This view assumes that a pin (not shown) has been plunged into the small diameter tube 70, and only the shoulder 132 of the FSW tool 130 is now visible. It was discovered during experimentation that the FSW tool shoulder 132 had significantly less contact with the small diameter tube 70 because of the more severe curvature the small diameter tube 70. In other words, the edges of the shoulder 132 are not in contact with the small diameter tube 70. As a result of this reduced shoulder 132 contact, it was determined that pin geometries had to be made more aggressive in order to increase material flow around the pin and thereby generate more heat.

Because of the low coefficient of friction in the FSW tool materials of the present invention, tools with smooth surface features generally produce less frictional heat than those with surface features designed to mechanically capture and transport more workpiece material. For the FSW of small diameter tubing 70 to be successful, pin geometries on the FSW tool needed to be modified to increase material flow around the pin and generate more heat. Stirring action generates heat, and stirring action is increased by creating pin geometries that have more aggressive surface features.

Figure 16:
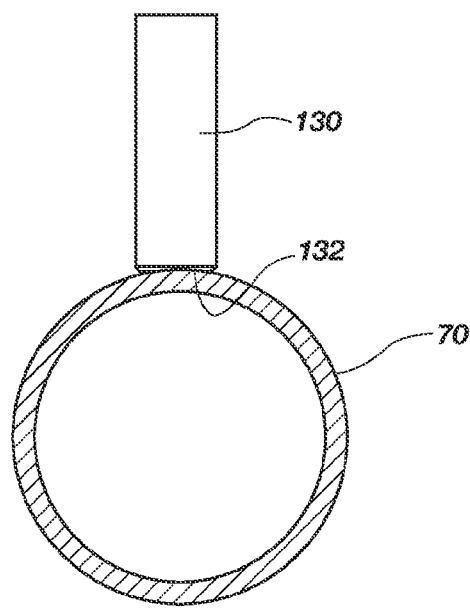
FIG. 16 is a perspective illustration of the FSW tool wherein the shoulder and the pin include aggressive surface features.

FIG. 16 is a perspective illustration of the FSW tool 130. The figure shows that the shoulder 132 and the pin 134 include aggressive surface features. The FSW tool 130 is shown with a scrolled shoulder 132. The scrolling on the shoulder 132 is manufactured so that rotation of the FSW tool 130 draws material from the workpiece toward the pin 134.

In a similar manner, an aggressive surface feature on the pin 134 also functions to move the material of the workpieces. In this embodiment, the pin 134 is shown having an aggressive stepped spiral thread profile. The stirring action of the shoulder 132 and the pin 134 serve to create more deformation heating than is typical when using a prior art FSW tool. By generating more heat through FSW tool surface features, the FSW tool 130 compensates for the heat that is not being generated by a shoulder 132 that has more contact when performing FSW of planar and large diameter tubing.

The stepped spiral thread profile of the pin 134 may have a pitch between 0.05 threads per inch (tpi) and 50 tpi.

While the embodiment shown in FIG. 16 shows a scrolled shoulder 132 in combination with a stepped spiral thread profile on the pin 134, the present invention should also be considered to include the concepts of an aggressive surface feature on the shoulder and not on the pin, an aggressive surface feature on the pin and not on the shoulder, as well as the combination shown in FIG. 16.

Aggressive surface features can also be combined for even greater stirring action. For example, coarser threads on the stepped spirals of the pin 134, more aggressive radial flats, or combinations of these features create more deformation heating during FSW. Thus, any aggressive surface features may considered to be within the scope of the present invention, and should not be considered limited to the specific aggressive features being shown.

To be considered aggressive, surface features on the pin 134 should extend at least 0.034% of the pin diameter below a surface thereof.

The ability to provide aggressive surface features on a FSW tool that is capable of FSW high melting temperature materials is a result of a new FSW tools. Previously, aggressive surface features would result in cracking of the superabrasive coating. The FSW tool would then eventually fail if use was continued. A new process for creating FSW tools with a superabrasive coating and aggressive surface features that can be used on high melting temperature materials made the new tool geometry possible.

The tool geometry described above can also be used in combination with tool positioning to modify weld characteristics. For example, the position of the FSW tool relative to the surface of the small diameter 70 can be used to create an acceptable surface finish, as well as a fully consolidated weld. This can be achieved by a combination of FSW tool positions relative to the surface of the small diameter tubing 70, tool RPM, and FSW tool travel speed. FSW tool travel speed should be between 0.02 inches per minute (ipm) and 50 ipm.

Figure 17:
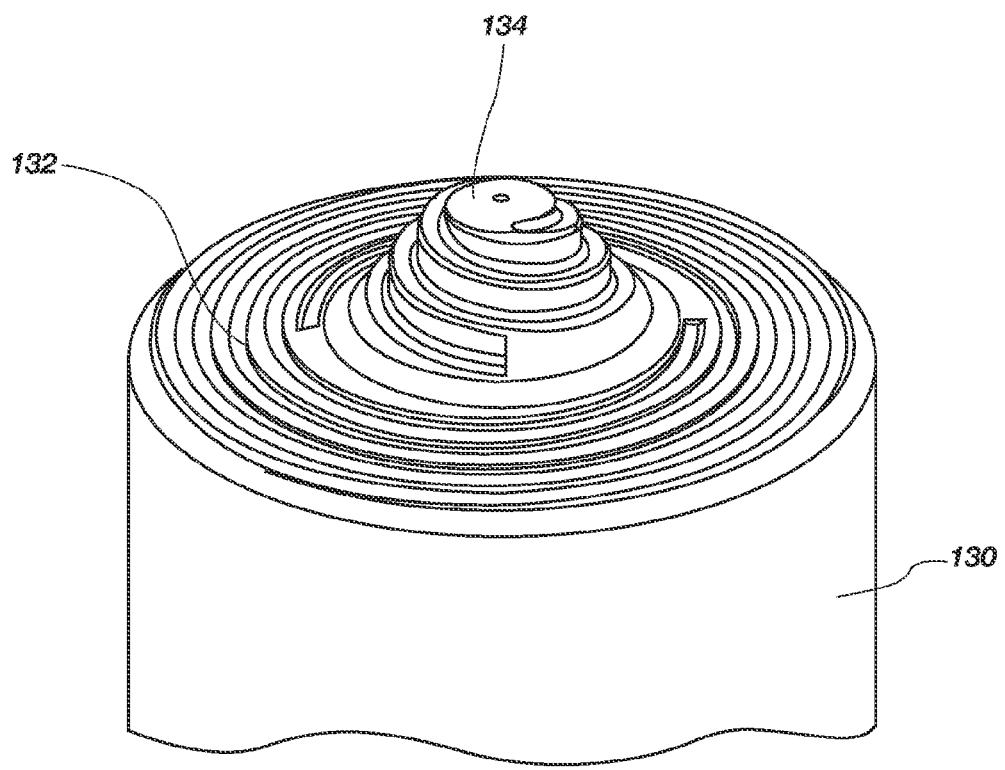
FIG. 17 is a cross-section view wherein the FSW tool is centered on the small diameter tube.
Figure 18:
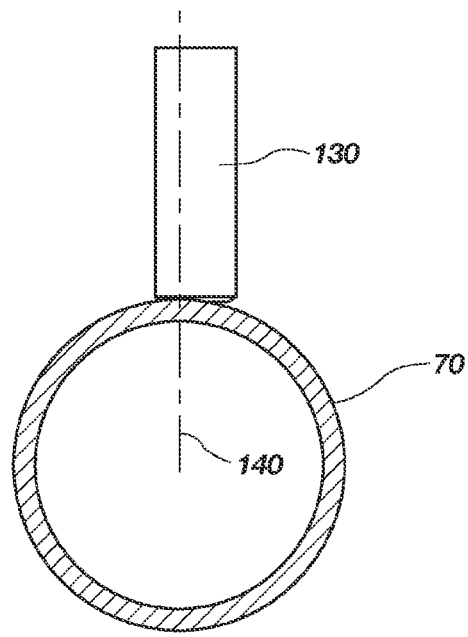
FIG. 18 is a cross-section view wherein the FSW tool is leading the small diameter tube
Figure 19:
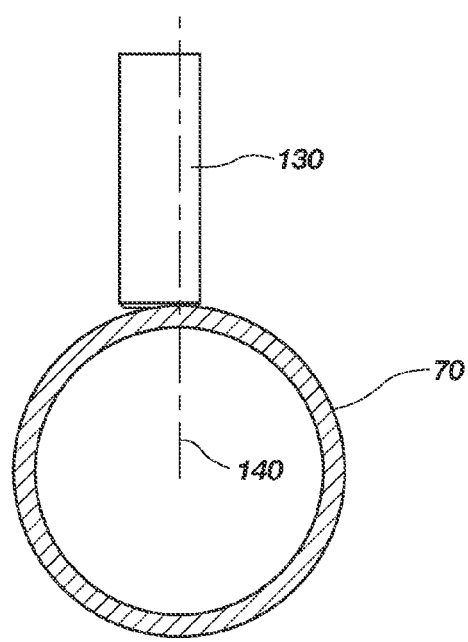
FIG. 19 is a cross-section view wherein the FSW tool is trailing the small diameter tube

FSW tool positioning is shown in three FIGS. 17, 18 and 19. In FIG. 17, the FSW tool 130 is shown in contact with the small diameter tube 70 shown in cross section, wherein the FSW tool is centered. In FIG. 18, the FSW tool 130 is shown in contact with the small diameter tube 70 shown in cross section, wherein the FSW tool is ahead of center 140. Finally, in FIG. 19, the FSW tool 130 is shown in contact with the small diameter tube 70 shown in cross section, wherein the FSW tool is trailing behind center 140.

Each different position of the FSW tool 130 changes the FSW joint and surface characteristics. It is noted that experimentation has shown that for most applications, a trailing configuration for the FSW tool 130 as shown in FIG. 19 is preferred. The trailing configuration keeps a substantial portion of the shoulder 132 on the small diameter tube 70, and provides desirable surface finishing characteristics to the weld. It is also important to remember that the more off-center the FSW tool 130 is placed relative to the small diameter tube 70, the higher the loads will be from the FSW tool to the tube.

When performing FSW on a small diameter tube, it is believed that the pin 134 of the FSW tool 130 may be moved ahead or behind the center of the small diameter tube by approximately 28% of the diameter. Furthermore, FSW tool 130 RPM during FSW should be kept between 36 and 1200 RPM.

There are additional FSW processing parameters that should also be considered within the scope of the present invention. Specifically, it possible to control FSW tool and weld zone temperature by making adjustments to FSW tool RPM, Z axis load, X axis load, FSW tool rotation speed, torque on the FSW tool and/or travel speed.

It is also possible to control Z axis load for changing RPM, X axis load, FSW tool position, spindle torque and/or FSW travel speed. Controlling X axis load is possible by changing RPM, Z axis load, FSW tool position, spindle torque and/or FSW tool travel speed. Controlling Z axis position is possible by changing RPM, Z axis load, X axis load, spindle torque and/or FSW tool travel speed.

Control Z axis loads using hydraulic actuation and servo actuation. Control X axis loads using hydraulic actuation and servo actuation.

It is also important for the FSW tool material to have a melting or sublimation point at greater than 1200 degrees C.

It was stated previously that applications of the present invention described above include any that require the use of small diameter tubing, as well as to generally arcuate surfaces. However, it is the oil and gas drilling and transportation industries that can particularly benefit from the ability to friction stir weld small diameter tubing because of their use of these materials.

The ability to quickly and accurately weld small diameter tubes such as pipes and casings is critical to pipeline and borehole operations. Casing is inserted into a borehole to prevent collapse of a borehole wall.

In the planning stages of a well, strategic depths at which the hole will need to be cased are selected in order for drilling to reach the desired total depth. With the casing depths determined, borehole sizes and corresponding casing sizes are selected. The hole drilled for each casing string must be large enough to easily fit the casing inside it, allowing room for cement between the outside of the casing and the hole. Furthermore, the inside diameter of the first casing string must be large enough to fit the second bit that will continue drilling. Thus, each casing string will have a subsequently smaller diameter.

Coupling casings to create a casing string involves joining two casings at the ends where they form a joint. Casings typically have a wide female end and a thinner and threaded male end. The male and female ends are coupled using the threaded screws to thereby create a longer length of pipe. However, the casings do not have to include threads for mechanically joining. Casings can also be correctly positioned for welding using a self-aligning geometry such as a flange, and then friction stir welded to create the casing string.

Figure 20:
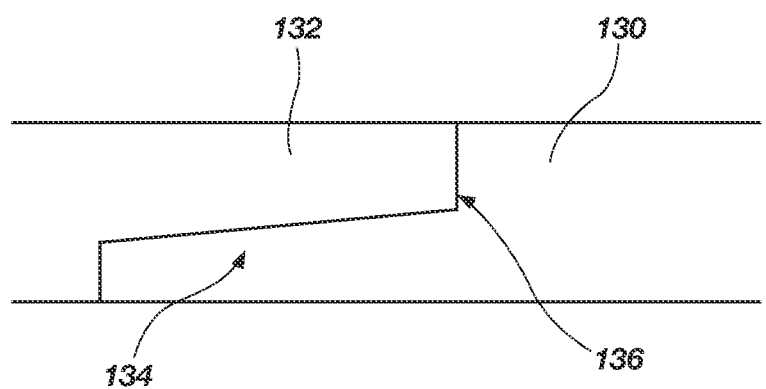
FIG. 20 is a cross-sectional view of a joint between two casings.

FIG. 20 is a cross-sectional view of a joint between two casings 130, 132. The casings 130, 132 include a section that includes mechanical threads 134, and a welding section 136 which does not. The casings 130, 132 are FSW along the welding section 136.

It should be understood that FIG. 20 is only one embodiment of many possible arrangements for casings to be friction stir welded together. The friction stir welding can be performed along smooth joints or threaded joints. The casings may have some type of self-aligning system, or not. What is important is the present invention is capable of FSW the casings 130, 132. Furthermore, using the RCPF 60, the casings can be friction stir welded in a vertical or horizontal position.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A mandrel for use in friction stir welding of a tubular object made from high melting temperature materials, said mandrel comprising:
    an expansion shell formed as a hollow cylinder having an outer diameter that is smaller than an inner diameter of a tubular object, wherein the expansion shell has a gap therein that is perpendicular to a top edge and a bottom edge thereof, and wherein the expansion shell that is disposed directly underneath a friction stir welding tool path is in continuous contact with an inner diameter of a tubular object;
    an expansion wedge disposed within the mandrel shell for causing expansion or contraction of the expansion shell by moving into and out of the gap;
    a first wedge disposed within the expansion shell;
    a second wedge disposed within the expansion shell and slidingly engaged with the first wedge on a diagonal edge and disposed underneath the expansion wedge, wherein movement of the first wedge against the second wedge causes the second wedge to apply a force against the expansion wedge, causing the expansion shell to expand.

2. The mandrel as defined in claim 1 wherein the mandrel is further comprised of a system for causing axial movement of the first wedge.

3. The mandrel as defined in claim 2 wherein the system for causing axial movement of the first wedge is further comprised of a hydraulic cylinder disposed coaxially with the expansion shell.

4. The mandrel as defined in claim 1 wherein the expansion shell is further comprised of an interchangeable section forming an outside surface of the expansion shell that can be replaced.

5. The mandrel as defined in claim 1 wherein the interchangeable section is aligned so as to be disposed underneath a FSW tool path.

6. The mandrel as defined in claim 4 wherein the interchangeable section is further comprised of a heating system for directing heat to the FSW tool path.

7. The mandrel as defined in claim 6 wherein the heating system is selected from the group of heating systems comprised of liquid heating and resistive heating.

8. The mandrel as defined in claim 4 wherein the interchangeable section is further comprised of a cooling system for cooling the FSW tool path.

9. The mandrel as defined in claim 1 wherein the mandrel has a hardness of between 12 and 75 Rockwell C.

10. The mandrel as defined in claim 1 wherein the mandrel is further comprised of a coating on the expansion shell to thereby prevent diffusion bonding of the tubular object to the expansion shell.

11. The mandrel as defined in claim 1 wherein the mandrel is further comprised of a plurality of relief cuts in the inside diameter of the expansion shell, wherein the relief cuts are parallel to the gap.

12. The mandrel as defined in claim 11 wherein the mandrel is further comprised of two lips, each lip disposed adjacent to and on either side of the gap.

13. The mandrel as defined in claim 12 wherein each of the lips is tapered away from each other and the gap.

14. The mandrel as defined in claim 1 wherein the gap in the expansion shell is closed when the expansion shell is at rest.

15. The mandrel as defined in claim 1 wherein the expansion shell has residual stresses that cause the expansion shell to be closed at the gap when the expansion shell is at rest.

16. The mandrel as defined in claim 15 wherein the residual stresses are created by disposing a plurality of fusion weld beads parallel to the gap and spaced equidistantly from each other in the expansion shell.

17. The mandrel as defined in claim 1 wherein the size of the expansion wedge can be modified so as to cause the expansion shell to expand more when a larger expansion wedge is used, and to cause the expansion shell to expand to a lesser degree when a smaller expansion wedge is used, to thereby accommodate different diameter tubular objects using the same expansion shell.

* * * * *